United States Patent [19]
Onishi et al.

[11] 4,181,604
[45] Jan. 1, 1980

[54] PROCESS AND APPARATUS FOR WASTE WATER TREATMENT

[75] Inventors: Hisao Onishi, Hiroshima; Ryozo Numazawa; Hitoshi Takeda, both of Otake, all of Japan

[73] Assignee: Mitsubishi Rayon Co., Ltd., Tokyo, Japan

[21] Appl. No.: 893,360

[22] Filed: Apr. 4, 1978

[30] Foreign Application Priority Data

Apr. 13, 1977 [JP] Japan .................................. 52-42349
Nov. 7, 1977 [JP] Japan ................................ 52-133324

[51] Int. Cl.² ............................................... C02C 1/04
[52] U.S. Cl. .......................................... 210/8; 210/17; 210/150
[58] Field of Search ................... 210/17, 150, 151, 3,8

[56] References Cited

U.S. PATENT DOCUMENTS

| | | | |
|---|---|---|---|
| 3,966,599 | 6/1976 | Burkhead | 210/17 X |
| 4,045,344 | 8/1977 | Yokota | 210/151 X |

FOREIGN PATENT DOCUMENTS 2192074  8/1974  France .......................... 210/17

Primary Examiner—Thomas G. Wyse
Attorney, Agent, or Firm—Oblon, Fisher, Spivak, McClelland & Maier

[57] ABSTRACT

Waste water containing organic pollutants is purified by biological treatment with aerobic microorganisms supported on hollow fibers having microporous walls through which oxygen is supplied to the microorganisms.

19 Claims, 2 Drawing Figures

PROCESS AND APPARATUS FOR WASTE WATER TREATMENT

BACKGROUND OF THE INVENTION

1. Field of the Invention

This invention relates to a process and an apparatus for biological treatment of water contaminated with organic substances.

More particularly, the invention relates to a process for biologically treating waste water containing organic pollutants in which the waste water is exposed to the action of aerobic microorganisms supported on hollow fibers and supplied with oxygen from within the hollow fibers.

2. Description of the Prior Art

The standard activated sludge, trickling filter, and rotary disk aeration processes and the like have been hitherto well known for biological purification of waste water.

However, these processes generally require extremely large equipment because of their small treatment capacity per unit volume. Also, the installation and operation of plants using such processes near residential districts is difficult because the apparatuses are usually not enclosed, which causes hygienic problems, such as offensive odors, splashing, etc.

The activated sludge process suffers from the deficiencies that very intensive aeration is required with accompanying expense due to the great power consumption, and that control of the process is difficult because the process is very sensitive to variations in load. In the trickling filter process, putrefaction and loss of treatment efficiency are caused by clogging of the filter or defective aeration. In the rotary disk aeration process, the efficiency of the treatment is often decreased when the growth of microorganisms sloughs off the surfaces of the supporting material because conditions at the supporting surface become anaerobic.

In apparatus for treating waste water by the action of aerobic microorganisms, important criteria of the treatment efficiency are the density of the microorganisms in the treating apparatus, how effeciently oxygen is supplied, and how thoroughly the waste water is brought into contact with the microorganisms. When conventional treating apparatuses are judged by the criteria described above, they are found to have the deficiencies that microorganisms can not be maintained at a high density, insufficient oxygen is supplied even in the cases where microorganisms can be maintained at a high density, the apparatuses are partly in an anaerobic state because oxygen is not uniformly supplied throughout the apparatuses, or the contact between waste water and microorganisms is insufficient. Hence, these apparatuses must be judged to be inefficient.

It has also been known that porous plastic tubes can be used as a gas dispersion apparatus for waste water; however, such tubes usually have a diameter of 3 mm or more, and the size of the pores in the wall of the tubes is 1-30μ. Hence the gas permeation rate is large, about 50-1,000 l/min. m². 0.5 atm.

When such tubes are used as a substrate for microorganisms, it becomes impossible to supply oxygen because the pores become clogged by the invasion and proliferation of microorganisms. The oxygen supply cannot be restored by increasing the gas supply pressure because the microorganisms are dislodged from the substrate tubes if the gas supply pressure is too high.

Therefore a need has continued to exist for an improved process for biologically treating and purifying waste water containing organic pollutants by means of aerobic microorganisms.

SUMMARY OF THE INVENTION

Accordingly, it is an object of the present invention to provide an improved process for biologically treating waste water containing organic pollutants. A further object is to provide a process for biologically treating waste water containing organic pollutants which uses aerobic microorganisms.

A further object is to provide a process for biologically treating waste water containing organic pollutants using aerobic microorganisms which are supported on tubes.

A further object is to provide a process for biologically treating waste water containing organic pollutants using aerobic microorganisms in which the microorganisms are efficiently supplied with oxygen.

A further object is to provide an apparatus for supporting aerobic microorganisms and efficiently supplying them with oxygen.

Further objects will be apparent from the following description of the invention.

As the result of intensive research made on the correction of defects of the conventional methods for waste water treatment, and on efficient processes and apparatuses wherein the operation is easily controlled, the present inventors have developed a process for treatment of polluted water by supplying oxygen from inside hollow fibers used as a substrate on which coatings of microorganisms are supported.

Accordingly to the process of this invention waste water containing organic pollutants is purified by being exposed to the action of aerobic microorganisms which are supported on the outer surface of at least one hollow fiber and supplied with oxygen from within the hollow fiber. The hollow fibers have an outside diameter of 0.01–3 mm. Oxygen is supplied to the microorganisms supported on the outside of the hollow fibers by introducing oxygen or a gas containing oxygen into the interior of the hollow fibers.

The apparatus for carrying out the process of this invention comprises at least one hollow fiber having a porous wall, which serves as a support for aerobic microorganisms, means for supplying oxygen or an oxygen-containing gas to the interior of the hollow fiber and means for supplying waste water containing organic pollutants to the exterior of the hollow fiber.

The apparatus and process will be more readily understood by referring to the accompanying drawings.

DETAILED DESCRIPTION OF THE PREFERRED EMBODIMENTS

Figure 1:
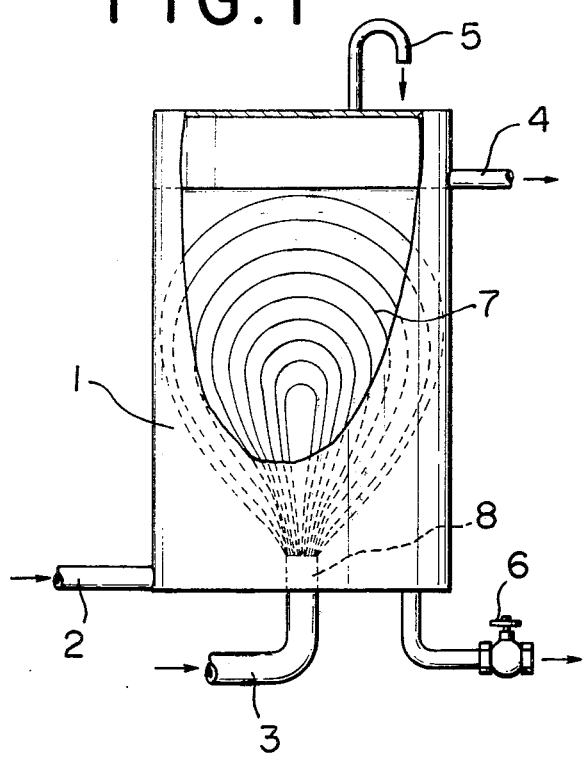
FIG. 1 illustrates one embodiment of the apparatus of this invention.

In the process of this invention a culture of aerobic microorganisms is prepared in the form of a coating on hollow fibers having porous walls. Oxygen is supplied to the organisms in gaseous form from within the hollow fibers, while waste water containing organic pollutants is supplied for treatment by passing it over the outside surfaces of the fibers which are covered with microorganisms.

The hollow fibers used in the process of this invention generally resemble those used in ultrafiltration, reverse osmosis, and similar processes. They generally have an outside diameter of 0.01-3 mm, preferably 0.05-1 mm.

The wall of the hollow fibers usually has a gas permeability of $1 \times 10^{-9}$ to $1 \times 10^{-4}$ ml·cm/cm²·sec·cmHg in the dry state. The pores in the wall of the hollow fibers are preferably so small that microorganisms in water can not invade them, and hollow fibers having a pore diameter of $0.5\mu$ or less are preferably used. The wall of the hollow fibers usually has a total pore volume of 0.1 to 1%.

The hollow fibers used in the present invention are manufactured by shaping an ordinary spinnable high polymer material, for example a polyolefin, such as propylene, polyethylene, etc., polyacrylontrile, cellulose acetate, aromatic polyamide, etc. into a hollow fiber form, and by making the fibers thus obtained porous. The hollow fibers may also be an inorganic material.

These are various methods for preparing hollow fibers according to the properties of the polymers.

For example crystalline polymers such as polyolefins may be shaped by melt-spinning into hollow fiber form, and then heat-treating the hollow fibers to enhance the degree of crystallinity, drawing the crystalline-enhanced hollow fibers to produce fine pores in the wall membranes and thermosetting the fibers to produce stable porous hollow fibers.

Wet or dry spinnable polymers such as polyacrylonitrile, polysulfones and cellulose acetate may be formed by spinning the solublized polymers into a non-solvent for the polymers, and gelatinizing the spun polymer in hollow fiber form. The hollow fibers are used in a suitable bundle for convenience of connection or aeration.

In the present invention, oxygen is supplied by introducing air, oxygen or air enriched with oxygen into the hollow fibers under pressure, and the amount of oxygen supplied is adjusted by appropriately varying the pressure supplied to the inside of the hollow fibers. In addition to the oxygen supplied through the inside of the hollow fibers, oxygen may be introduced into the polluted water if necessary.

According to the process of the present invention, the treatment of polluted water requires the first step of forming a coating of microorganisms on the hollow fibers. This step is accomplished by circulating polluted water containing a seed sludge through the treating apparatus for 10 days to 2 weeks as in the conventional activated sludge process.

The microorganism coatings thus formed are stable even under high load and a sudden variation in load. When the microorganism coatings develop beyond certain limits, they slough off from the surface layers of the substrate as aggregations of microorganisms; however, the amount lost is much smaller than in the rotary disk aeration process, and the microorganism aggregations which do slough off can be readily separated and removed because they settle well. By the process of the present invention, a large number of microorganisms can be maintained, thus providing a great deal of autolysis and producing a very small amount of excess sludge.

The treating apparatus used in the process for waste water treatment of the present invention comprises a substrate for microorganisms comprising at least one, preferably a bundle of many gas-permeable hollow fibers, having a gas supply means connected to one end or both ends of the hollow fibers, which is disposed in the flow of waste water.

The hollow fibers which serve as substrate membranes for the microorganisms, as described above, are preferably fibrous materials, with a central axial cavity, the walls of which have pores, $0.5\mu$ or less in diameter, uniformly distributed throughout, and consequently have excellent gas permeability. Microorganism layers are formed on the surfaces of said hollow fiber substrate membranes, and a gas containing oxygen is supplied from inside the hollow fibers to the microorganism layers.

The gas supply means is an apparatus to supply oxygen or a gas containing oxygen to the aerobic microorganisms, or a vessel to store the gases under pressure. The open ends of the bundle of hollow fibers are connected to the gas supply means directly or via a pipe line so that the gas can be introduced into the hollow fibers from the gas supply means.

In order to supply waste water containing organic pollutants to the microorganisms supported on the hollow fibers the bundle of fibers may be located in a treatment container such as a tank, tower, pipe, ditch, pond, or the like.

In various embodiments of the apparatus of the present invention, the hollow fibers connected to the oxygen source may be immersed in the waste water, or the waste water may be caused to flow over the surfaces of the hollow fibers. The treating apparatus can be easily manufactured in any convenient shape, such as a tower, pipe, tank, or the like. In the manufacture of the treating apparatus, any feasible arrangement for connecting the hollow fibers to the oxygen supply may be used, such as connecting both ends of the hollow fibers to the oxygen supply means, leaving one end of the U-shaped hollow fibers open and connecting the other end to the oxygen source, or sealing one end of each hollow fiber and connecting only the other end to the oxygen supply means, etc. Thus, the hollow fibers connected to the oxygen supply means can be mounted in the apparatus by fixing both ends, or by fixing one end while allowing the other end of each fiber to float free, or be suspended. In the process of the invention, scarcely any excess sludge is produced, or, if some is produced, its amount is very small; hence, the apparatus can be operated for a long time by merely removing the excess sludge from the bottom of the treating apparatus in case a tower or tank type apparatus is used. Furthermore, the treatment efficiency can be increased by providing a separate sludge settling tank.

The apparatus in the present invention will be illustrated by the accompanying drawings.

FIG. 1 illustrates one embodiment of the apparatus of the present invention. In FIG. 1 the vessel 1 is the outer wall of the treatment chamber. Although shown as cylindrical in shape, the treatment chamber may be cubic or have other shapes. The treatment chamber is provided with an inlet 2 and a discharge outlet 4 for the liquid to be treated, through which said liquid is introduced and discharged. In FIG. 1, the port 2 and the port 4 are shown as the inlet and outlet respectively; however, alternatively, the liquid may be introduced through the port 4 and discharged from the port 2.

The ports 2 and 4 are preferably located in the outer wall of the treatment chamber as far apart as possible.

The pipe 3 is a gas supply pipe, which is connected to the open ends 8 of the bundle of looped hollow fiber membranes 7 near the inlet of the liquid into the treatment chamber. The hollow fiber membranes 7 are kept dispersed in the liquid of the treatment chamber. In this embodiment, the hollow fiber membranes are in the form of loops and gas is supplied from both ends; however, one end of each hollow fiber may be connected to the gas supply means and the other end of each fiber may be sealed and allowed to float free in the liquid. The port 5 is the gas outlet, and the port 6 is the precipitate discharge outlet.

The gas supply pipe 3 may be inserted into the purifying zone from above or from the side, or plural bundles of hollow fibers may be connected to the tips of plural branches of the gas supply pipe.

Figure 2:
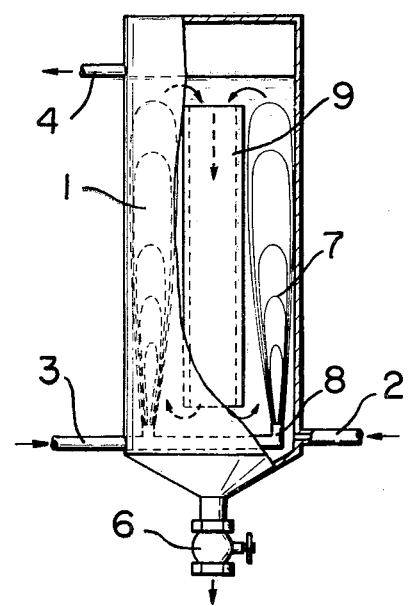
FIG. 2 illustrates an alternate embodiment of the apparatus of this invention.

A part of the treated water from the outlet of the treatment chamber can be recycled, e.g., by a pipe, to the inlet or near it to increase the treatment efficiency. As shown in FIG. 2, recycling of treated water also can be attained by providing a cylinder 9 in the treatment chamber, through which polluted water from the upper part of the chamber can be recycled to the lower part without the use of a pump.

A number of waste water treatment apparatuses according to this invention can be connected in series or in parallel.

The process and apparatus of this invention have a number of advantages over the procedures hitherto used.

A very large contact area can be provided in a relatively small volume, and the fibers can be dispersed relatively uniformly throughout the treatment volume. The large area per unit volume allows a proportionately large number of microorganisms to be maintained in a relatively small volume. Furthermore, the microorganisms can be maintained in an active condition since they are well-supplied with oxygen. Since the oxygen is supplied from within the supporting hollow fibers, the microorganisms next to the supporting surfaces are not forced to exist under anaerobic conditions. This assures that the entire mass of microorganisms is kept uniformly and constantly in an active state and also minimizes sloughing of the microorganisms from the supporting surface. The microporous character of the fiber walls prevents clogging of the pores or damage to the microorganisms by excessive gas pressure as can occur when the aerating tubes of the prior art, which have coarser pores, are used. Since all the hollow fibers are directly connected to the oxygen supply, all parts of the treatment apparatus and the microorganisms contained therein are uniformly aerated. This direct aeration also assures efficient use of oxygen, whereby oxygen consumption for a given amount of purification is minimized. Since the apparatus is very efficient it may be of relatively small size and light weight with attendant economies in manufacturing and easier operation and control. Furthermore, the amount of autolysis of the microorganisms is great and hence the amount of excess sludge formed is very small, since a large number of microorganisms can be maintained in the apparatus.

When treated water is recycled to the inlet region of the treatment tank as described above, further advantages are evident. The loading of the microorganisms is more uniform throughout the treatment vessel. The shock to the microorganisms caused by high loading is reduced. The microorganism culture is formed more uniformly on the outside of the fibers.

The process of the present invention itself provides an improved method for treatment of polluted water; however, it may also be used in combination with other treating processes, for example, the trickling filter, standard activated sludge, and rotary disk activated sludge processes, or chemical, or physical treating processes, etc.

In summary, the process of this invention can be widely applied to the treatment of waste water containing pollutants capable of being treated with aerobic micoorganisms, and is very effective in miniaturizing and economizing the apparatus because of its high treatment efficiency. It can be readily applied to waste water treatment on a small scale because of its easy operation, maintenance and control.

Having generally described the invention, a more complete understanding can be obtained by reference to certain specific examples, which are included for purposes of illustration only and are not intended to be limiting unless otherewise specified.

EXAMPLE 1

A cylindrical treating tank, 0.25 m in diameter, 0.50 m in depth, provided with an inlet for waste water at the bottom and an outlet for treated water at the top was packed with 25,000 hollow polypropylene fibers having an outside diameter of $100\mu$ and an inside diameter of $50\mu$ which were fixed to the tank at the top and the bottom. An air pressure of 0.8 kg/cm$^2$G was then applied to the bundle of hollow fibers from both ends of said fibers, and waste water was subjected to biological treatment while air (or oxygen) was fed from inside the hollow fibers.

An artificial waste water was prepared which consisted mainly of glucose and had a COD cr of approximately 1,000 ppm and a pH of 7.0. The apparatus was operated continuously for 3 months while the water temperature was controlled at $25°\pm1°$ C. during the treatment.

Results of the experiment showing the extent of elimination of COD cr produced at various principal stages of the treating process and varying amounts of loading are presented in Table 1.

TABLE 1

| Operation time (day) | Amount of COD cr loading* (kg/m$^3$ day) (Seed sludge added) | Extent of elimination of COD cr (%) |
|---|---|---|
| 7 | 4.0 | 27.2 |
| 10 | 3.8 | 57.1 |
| 15 | 4.7 | 94.5 |
| 16 | 8.9 | 91.0 |
| 17 | 19.8 | 87.0 |
| 30 | 20 | 90.2 |
| 60 | 23 | 90.3 |
| 90 | 20 | 92.5 |

*Amount of COD cr fed per unit volume of treating apparatus per day.

The pH during the treatment was not specially controlled; however, it was stable within the range of 6.0–7.0. Sludge which settled at the bottom of apparatus was periodically removed; very little was found. Oxygen in the exhaust gas was analyzed and the oxygen utilization efficiency was determined. 60–70 percent of the oxygen supplied was utilized after 17 days of operation. This utilization efficiency is several times that of the standard activated sludge process.

As is evident from Table 1, the findings show that the process is stable even under sudden variations in loading, and a good treating capacity can be obtained even under a high COD loading.

For purposes of comparison, the same waste water was treated with a standard activated sludge treating apparatus at a sludge concentration in the tank of 4,000–6,000 ppm. When the amount of COD cr loading was 2 kg/m³ day or more, the treatment became unstable, and when the COD cr loading was 3 kg/m³ day the treatment was found to be completely impossible. It took a long time to acclimate the sludge, and about one month to increase the loading to 2 kg/m³ day.

EXAMPLE 2

Biological treatment was effected by the use of the same apparatus as in Example 1 while supplying pure oxygen instead of air.

The apparatus was operated continuously using the artificial waste water consisting mainly of glucose in the same way as in Example 1 for 2 months.

The extent of elimination of COD cr was determined for varying amounts of loading, and the results thus obtained are shown in Table 2.

TABLE 2

| Amount of COD cr loading (Kg/m³·day) | Extent of elimination of COD cr (%) |
|---|---|
| 10 Kg | 95 |
| 20 | 91 |
| 25 | 91 |

As illustrated by Example 2, waste water can be treated at a high efficiency even with pure oxygen without inhibiting the microorganisms.

EXAMPLE 3

A cylindrical treating tank of 19.5 cm in diameter and 265 cm in depth, was packed with 5200 hollow polyethylene fibers having an inside diameter of 240$\mu$, an outside diameter of 280$\mu$ and 5.3 m in length, both ends of which were connected to a gas supply pipe which was fixed at the bottom of the tank. An air pressure of 0.8 kg/cm²G was then applied to the inside of the hollow fibers from the gas supply pipe, and effluent from a refectory was fed at the top of the tank at a rate of 100 l/hr.

The effluent was accumulated in a reservoir during the day-time and was fed to the tank continuously day and night. The BOD and COD cr of the effluent were from 100 to 150 ppm and 250 to 350 ppm respectively.

The temperature of the effluent in the tank was in the range of 13° to 21° C. The pH during the treatment was stable within the range of 6.5 to 7.0. When the operation was continued for two weeks, the extent of elimination od COD cr and BOD proved to be 85 to 90% and more than 95%, respectively; subsequently the extent of elimination remained constant.

The operation was carried out continuously for three months, and scarcely any excess sludge was produced. Furthermore, the amount of suspended solids in the effluent decreased to 20–30 ppm from 60–100 ppm.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for treating water polluted with organic substances by the action of microorganisms, comprising:
    supporting aerobic microorganisms on the outer surface of at least one hollow fiber having a porous wall, said fiber containing pores or a size sufficiently small to prevent invasion of the pores by said microorganisms but of a size sufficient to efficiently support microorganism life by oxygen diffusion therethrough and said fiber having an outside diameter of a size sufficient to supply oxygen to said microorganisms;
    supplying oxygen to said microorganisms from the interior of said hollow fiber; and
    contacting said polluted water with said supported microorganisms while supplying oxygen to said microorganisms from the interior of said hollow fiber.

2. The process of claim 1, wherein the hollow fiber has an outside diameter of 0.01 to 3 mm.

3. The process of claim 1, wherein the pore size in the wall of the hollow fiber is 0.5$\mu$ or less in diameter.

4. The process of claim 1, wherein the gas permeability of the wall of the hollow fiber is $1\times10^{-9}$ to $1\times10^{-4}$ ml·cm/cm²·sec.·cmHg.

5. The process of claim 1, wherein the hollow fiber is of polypropylene.

6. The process of claim 1, wherein the hollow fiber is of polyethylene.

7. The process of claim 1, wherein a part of the treated water is recycled to the contaminated water.

8. An apparatus for the biological treatment of water polluted with organic substances, comprising:
    at least one hollow fiber having a porous wall and having a colony of microorganisms on the exterior surface thereof, said fiber containing pores of a size sufficiently small to to prevent invasion of the pores by said microorganisms but of a size sufficient to efficiently support microorganism life by oxygen diffusion therethrough and said fiber having an outside diameter of a size sufficient to supply oxygen to said microorganisms;
    means for supplying oxygen to the interior of said hollow fiber; and
    means for applying polluted water to be treated to the exterior surface of said fiber.

9. The apparatus of claim 8 wherein at least one bundle of said fibers is present.

10. The process of claim 8, wherein the hollow fiber has an outside diameter of 0.01 to 3 mm.

11. The process of claim 8, wherein the pore size in the wall of the hollow fiber is 0.5$\mu$ or less in diameter.

12. The process of claim 8, wherein the gas permeability of the wall of the hollow fiber is $1\times10^{-9}$ to $1\times10^{-4}$ ml·cm/cm²·sec.·cmHg.

13. The process of claim 8, wherein the hollow fiber is of polypropylene.

14. The process of claim 8, wherein the hollow fiber is of polyethylene.

15. The apparatus of claim 8 wherein said means of supplying polluted water to the surface of said fiber comprises a tank having an inlet pipe supplying polluted water to an inlet region of said tank and an outlet pipe removing treated water from an outlet region of said tank.

16. The apparatus of claim 15 additionally comprising means for recycling said treated water to the inlet region of said tank.

17. The apparatus of claim 16, wherein said means for recycling treated water comprises a pipe connected between said outlet region and said inlet region.

18. The apparatus of claim 16, wherein said means for recycling treated water comprises a pipe connected between said outlet pipe and said inlet region.

19. The apparatus of claim 16 wherein said means for recycling treated water comprises a hollow cylinder fixed within the tank having one end communicating with said outlet region and the other end communicating with said inlet region.

* * * * *